(12) United States Patent
Natta et al.

(10) Patent No.: US 6,365,687 B1
(45) Date of Patent: Apr. 2, 2002

(54) PROCESS FOR THE POLYMERIZATION AND COPOLYMERIZATION OF CERTAIN UNSATURATED HYDROCARBONS

(75) Inventors: Giulio Natta; Piero Pino; Giorgio Mazzanti, all of Milan (IT)

(73) Assignee: Basell Poliolefine S.p.A., Milan (IT)

( * ) Notice: Subject to any disclaimer, the term of this patent is extended or adjusted under 35 U.S.C. 154(b) by 0 days.

(21) Appl. No.: 07/883,912

(22) Filed: May 12, 1992

Related U.S. Application Data

(60) Continuation of application No. 07/719,666, filed on Jun. 24, 1991, now abandoned, which is a continuation of application No. 07/607,215, filed on Oct. 29, 1990, now abandoned, which is a continuation of application No. 06/906,600, filed on Sep. 10, 1986, now abandoned, which is a continuation of application No. 06/498,699, filed on May 27, 1983, now abandoned, which is a continuation of application No. 04/710,840, filed on Jan. 24, 1958, now abandoned, which is a division of application No. 04/514,097, filed on Jun. 5, 1955, now abandoned.

(30) Foreign Application Priority Data

Jun. 8, 1954 (IT) .................................................. 24227
Jul. 27, 1954 (IT) .................................................. 25109

(51) Int. Cl.$^7$ .......................... C08F 4/642; C08F 210/02
(52) U.S. Cl. ....................... 526/159; 526/308; 526/348; 526/348.5; 526/348.6
(58) Field of Search ................................. 526/159, 308, 526/348, 348.5, 348.6

(56) References Cited

U.S. PATENT DOCUMENTS

| | | | | | |
|---|---|---|---|---|---|
| 2,721,189 A | * | 10/1955 | Anderson et al. | ............ | 526/159 |
| 2,825,721 A | * | 3/1958 | Hogan et al. | ................ | 526/106 |
| 2,842,531 A | * | 7/1958 | Baxter | ......................... | 526/346 |
| 2,862,917 A | * | 12/1958 | Anderson et al. | ............ | 526/159 |
| 2,905,645 A | * | 9/1959 | Anderson et al. | ............ | 526/159 |
| 3,014,016 A | * | 12/1961 | Natta et al. | .................. | 526/159 |
| 3,050,471 A | * | 8/1962 | Anderson et al. | ............ | 526/159 |
| 3,058,963 A | * | 10/1962 | Vandenberg | ................ | 526/153 |
| 3,113,115 A | * | 12/1963 | Ziegler et al. | .............. | 526/159 |
| 3,161,624 A | * | 12/1964 | Natta et al. | .................. | 526/159 |
| 3,197,452 A | * | 7/1965 | Natta et al. | .................. | 526/159 |
| 3,257,332 A | * | 6/1966 | Ziegler et al. | .............. | 526/159 |
| 3,261,820 A | * | 7/1966 | Natta et al. | .................. | 526/159 |
| 3,582,987 A | * | 6/1971 | Natta et al. | .................. | 526/159 |
| 3,826,792 A | * | 7/1974 | Ziegler et al. | .............. | 526/159 |
| 4,125,698 A | * | 11/1978 | Ziegler et al. | .............. | 526/159 |
| 4,371,680 A | * | 2/1983 | Baxter et al. | ............... | 526/159 |

\* cited by examiner

*Primary Examiner*—Fred Teskin

(57) ABSTRACT

This invention relates to a process for copolymerizing unsaturated hydrocarbons of the formula $CH_2=CHR$ in which R is a saturated aliphatic radical with two or more carbon atoms or a cycloaliphatic radical, in the presence of a catalyst comprising a catalytic aluminum alkyl compound and a catalytic titanium halide compound.

34 Claims, No Drawings

PROCESS FOR THE POLYMERIZATION AND COPOLYMERIZATION OF CERTAIN UNSATURATED HYDROCARBONS

This is a continuation, of U.S. application Ser. No. 07/719,666, filed Jun. 24, 1991, now abandoned, which is a continuation of 07/607,215, filed Oct. 29, 1990, now abandoned, which is a continuation of 06/906,600, filed Sep. 10, 1986, now abandoned, which is a continuation of 06/498,699, filed May 27, 1983, now abandoned, which is a continuation of 04/710,840, filed Jan. 24, 1958, now abandoned, which is a divisional of 04/514,097, filed Jun. 8, 1955, now abandoned, each of which is incorporated by reference herein.

This invention relates to a process for polymerizing unsaturated hydrocarbons of the formula $$CH_2=CHR$$

in which R is a saturated aliphatic, an alicyclic or an aromatic radical, alone, in mixture with one another, or in mixtures with small amounts, up to about 5%, of a monomer polymerizable therewith.

Uniquely, the initial polymerization products obtained by the present method are mixtures of linear, head-to-tail amorphous and crystalline polymers having no branches longer than R. The polymers can be separated from the polymerizate by fractional dissolution. The crystalline polymers may comprise as nigh as 30% or even up to 55% of the mixture and have high molecular weights and fiber forming properties. The amorphous polymers may also have relatively high molecular weights and may exhibit rubber-like properties.

It has been proposed, in the Belgian patent No. 533,362, to polymerize ethylene to polymers of high molecular weight of the order of 300,000 up to 2,000,000 or more, by using as reaction initiators, agents obtained by reacting a catalytic heavy metal compound and a catalytic metal alkyl compound.

The catalytic heavy metal compounds we use in preparing the catalyst for the polymerization of the alpha-olefins to polymers having the steric structures described below are halides of heavy metal selected from the sub-group of Groups IV to VI of the Periodic Table, including thorium, and uranium, i.e., halides of the elements of titanium, zirconium, hafnium, thorium, vanadium, tantalum, niobium, chromium, molybdenum, tungsten and uranium. These are metals belonging to Groups IVa, Va and VIa of the Mendeleeff Periodic Table.

The catalytic metal alkyl compounds we use in preparing our catalyst are alkyl compounds of elements selected from the group forming the 2nd and 3rd columns of the Periodic Table, i.e., beryllium, magnesium, zinc, cadmium and other elements of the 2nd group, as well as boron, aluminum and other elements of the 3rd group.

The valences of the aforesaid elements are linked to the same or different alkyl radicals such as ethyl, propyl, butyl, etc. One valence of the element may be satisfied by halogen, or alkoxy radicals.

Although, as stated, the polymerization aids obtained by reacting heavy metal compounds and metal alkyl compounds in a solvent inert to the polymer to be formed, such as a saturated aliphatic hydrocarbon, were found useful in the production of high polymers of ethylene, it was not apparent that those agents would be useful in the polymerization of the unsaturated hydrocarbons containing the vinyl group.

Processes and polymerization promoters that are useful for producing polyethylene of high molecular weight are not necessarily useful for producing high molecular weight polymers of the higher homologues of ethylene, such as, for instance, propylene.

In the past, it has been found that when various promoters or catalysts useful in producing high molecular weight polyethylene have been used with the higher homologues, for instance only dimers, trimers or tetramers forming light oils, or somewhat higher polymers comprising more or less viscous lubricating oils.

The products obtained by polymerizing the higher ethylene homologues by processes known in the art generally consist of mixtures of polymeric homologues containing variously branched isomers. The higher the temperature used, the smaller the degree of polymerization. But even when the known processes are carried out at relatively low temperature the products obtained are still mainly liquids or mixtures of liquids and amorphous products in which the liquid component is present in substantial amount.

Prior to this invention, it has been considered that polymerization of olefins $CH_2=CHR$, i.e., olefins in which one of the hydrogen atoms of a $CH_2$ group is replaced by a $CH_3$ group, such as propylene, results in non-crystalline polymers. Thus, it has been stated in the literature ("Fibers from Synthetic Polymers", Rowland Hill, Ed., Elsevier Publishing Co., 1953, p. 319) that:

"Polymers of olefins in which one of. the hydrogen atoms of a $CH_2$ group is replaced by a $CH_3$ group, are usually non-crystalline, owing to stereochemical irregularity."

It was believed, further, that the low crystallinity exhibited by polyvinyl chloride for example, was due to the fact that over some short sections of the polymer main chain the configurations of the tertiary carbon atoms of the CHC1 groups are alternately levo and dextro.

Furthermore, it was assumed that, since the methyl group is similar in size to the chlorine atom, it was to be expected that polymers like polypropylene in which one could assume that tertiary asymmetric carbon atoms of the main chain having different steric configurations would occur in a random distribution, would be non-crystalline, owing to the stereochemical irregularity. ("Fibers Prom Synthetic Polymers", supra, p. 235, Hill & Walker, Jr. of Polymer Science, Vol. III, 1948, p. 609).

It has been found, also, that even when ethylene is polymerized with the aid of the special promoters obtained by reaction of heavy metal and metal alkyl compounds, in the ratios proposed for promoting ethylene.

The slowness to polymerize exhibited by the higher olefins is not overcome by merely increasing the polymerization temperature, since when the special aids described herein are used, temperatures which promote the growth of the polymer chain, bound in the form of a metallo-organic compound, without appreciably favoring its disassociation into low molecular weight olefins must be used.

In view of the foregoing, it could not be predicted, from the work with ethylene, that our polymerization agents would be useful for the production of higher molecular weight polymers of the vinyl hydrocarbons of formula $CH_2=CHR$ as defined herein.

Surprisingly, we have now foud that, in fact it is possible to obtain high molecular weight polymers of propylene and other monomeric vinyl hydrocarbons of that type, i.e., containing more than three carbon atoms per molecule and including styrene, and to produce the polymers at commercially acceptable reaction rates and in good yields, with the aid of the aforesaid initiators if the initiator is prepared from the heavy metal halide and metal alkyl compound in appropriate molar ratios.

In accordance with the invention, the new polymerization products are obtained by polymerizing monomeric material comprising at least one of the vinyl hydrocarbons containing three or more carbon atoms per molecule in the presence of polymerization aids obtained by reacting the heavy metal halide and metal alkyl compound in molar ratios such that the metal alkyl component is not more than ten times the heavy metal halide and is preferably less than five times the heavy metal halide, as will be seen from the examples given hereinafter. The catalyst is the reaction product of (a) a chloride of titanium with (b) an alkyl aluminum compound in which at least two of the valences of aluminum are satisfied by alkyl groups, and in which the third valence can be satisfied by alkyl or halide. The catalyst may also be the reaction product of (a) a chloride of titanium with (b) an aluminum trialkyl compound, in which the alkyl groups have up to four carbons each. To obtain a highly active catalyst, and effect smooth polymerization of the olefin, it is important to carry out the reaction between the heavy metal halide and the metal alkyl compound in an inert solvent preferably a saturated hydrocarbon solvent. This insures that the reaction proceeds smoothly, without violence, and without a strong temperature increase which would be considerable if the catalyst were used without prior dilution thereof.

Solvents suitable for use in preparing the polymerization catalyst are paraffinic hydrocarbons such as, for instance, a light gasoline, (substantially free of olefinic bonds), n-heptane, iso-octane, and other substances preferably of the non-aromatic type. However, benzene has also been used.

The solvents selected should preferably have boiling points lower than 150° C. and not swell the highest molecular weight polymers obtained.

The heavy metal halide and metal alkyl compound may be dissolved separately in a solvent of the same group, and the solutions then brought together maintaining a low temperature, preferably a temperature somewhat below room temperature, such as 0° C. to 20° C.

It has also been found advantageous, in some instances, to add a small amount of isopropyl alcohol to the solution of the metal alkyl compound in one of the aforesaid solvents before adding the solution of the heavy metal halide to it.

Preferably, the solution of the heavy metal halide is added dropwise to the cooled solution of the metal alkyl compound.

The composition thus obtained may be further diluted with solvent and introduced into an autoclave for instance of the oscillating stainless steel type.

The autoclave should be previously thoroughly dried and evacuated because it is of general advantage to carry out the entire process in the absence of oxygen and water.

The presence of oxygen and water should be limited to small quantities, i.e., impurities, because they will consume a part of the metal alkyl component.

The vinyl hydrocarbon or mixture containing it is preferably dried carefully and then pumped into the autoclave either in the liquid or gaseous phase, or as a mixture of both phases.

In the autoclave, the monomeric material is heated to a temperature below 120° C., and preferably to a temperature between 50 and 100° C. The pressure applied in the autoclave is preferably held between normal atmospheric pressure and 30 atmospheres, i.e., a relatively low pressure is used compared with that applied in other polymerization processes.

The polymerization can be carried out at a temperature between 50 and 100° C. and more specifically between 60 and 70° C. for the polymerization of propylene.

The upper limit for the temperature range is determined by the fact that at temperatures substantially above 100° C.

During the polymerization step in the autoclave the pressure falls gradually with progressing polymerization. The vinyl hydrocarbon or mixture may be pumped in one or several batches.

The polymerization lasts for several hours up to several days, the autoclave being kept in motion until the decrease of pressure ceases. The gaseous phase above the reaction product is then vented, and the reaction product consisting of a solid mass is worked up.

The reaction mass contains, as impurities, inorganic compounds originating from the decomposition of the catalyst as well as residual catalyst itself. The product is, therefore, treated with a suitable agent, for instance methanol, for decomposing the residual catalyst, and the product which is still soaked with the inert solvent and, say, methanol, then contains (a) isotactic (crystalline) polymers;
(b) partially isotactic polymers (such as the partially crystalline fraction described in Examples 1 and 2 below);
(c) non-isotactic or atactic (amorphous) polymers;
(d) inert solvent;
(e) methanol or the like; and
(f) inorganic compounds, e.g., of Al and Ti.

This mass may be treated with isopropyl ether to dissolve the amorphous polymers; a dark suspension of the crystalline polymer including the inorganic compounds remains. By bubbling HCl through, the inorganic compounds are dissolved and the suspension becomes white. (The crystalline polymer remains undissolved.) By adding additional methanol, most of the dissolved amorphous polymer is precipitated. The purified polymer mixture is separated by filtration from the solvent mixture.

The initial polymerization product is, as has been stated, a mixture of polymers. It comprises, usually, a small amount of an oily low molecular weight fraction, an amorphous fraction of higher molecular weight, and a high molecular weight fraction, the amorphous and crystalline polymers making up the bulk, generally, of the mixture.

The products are thus mainly made up of polymers that can be classified in two types, not crystallizable, amorphous and crystalline. The mixtures can be used as such for various purposes, or the different fractions can be separated depending on their solubility in various solvents; the fractions varying in their amorphous and crystalline contents, in average molecular weights, and specific viscosity.

The molecular weight of the products was estimated from specific viscosity measurements in tetrahydro-naphthalene solutions at a polymer concentration of 0.1 gm. per 100 gms. of solvent and from intrinsic viscosity measurements. Specific viscosity is the viscosity of the solution less the viscosity of the solvent, divided by the viscosity of the solvent. By "intrinsic viscosity" is meant the limit of the ratio between specific viscosity and concentration for concentrations tending to zero $$(\underset{C \to 0}{\text{Limit}} \frac{\mu_{spec}}{C},$$

where
C is the concentration of the solution in gms/cs.).

Products having an average molecular weight above 20,000 and up to 400,000 and higher may be obtained. The products are initially, and as has been stated, mixtures of polymers.

These mixtures comprise polymers which, depending on their steric structure, and their molecular weight, have very different characteristics. The amorphous products have viscous elastic properties comprised between those of a highly viscous liquid and those of an unvulcanized, non-crystallizable elastomer, while the solid, highly crystalline products, which can be oriented by drawing, give products of fiber-like behaviour. Both types of polymers are, as shown by their infra-red spectra, linear; in the case of polypropylene, e.g., both amorphous and crystalline polymers have similar infra-red spectra which are completely different from the infra-red spectra of the known branched polypropylene in which the branches are longer than R.

The difference in the properties of the two types of polymers which we have obtained, must be attributed to a different distribution, along the main chain, of those asymmetric carbon atoms having the same steric configuration.

According to Flory (Principles of Polymer Chemistry, 1953, pg. 55–56, 237–38) a vinyl polymer containing asymmetric carbon atoms, as e.g.

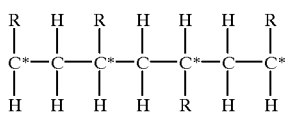

may be considered as a copolymer of two different monomer units

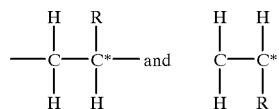

in one of which the asymmetric C atom has a $\underline{l}$ configuration, and in the other a d configuration.

When such monomer units containing an asymmetric carbon atom showing a $\underline{l}$ or $\underline{d}$ configuration recur statistically along the polymer chain, as in general in all known vinyl polymers, the polymer may be considered as a copolymer of the two types of structural units, and therefore, if the substituent R is much larger than a H atom, is substantially non-crystalline and does not show any 1st order transition point.

Up to now the only known example of a vinyl polymer existing in an amorphous and in a crystalline form are the polyvinyl ethers prepared by Schildknecht and co-workers (Ind. Eng. Chem. 40 (1948) 2104, ibid. 41 (1949) 1998, 2891). The structure of the new crystalline high polymers of the alpha-olefins obtained by the present process was determined from x-rays data on drawn fibers of said polymers.

The elementary cell dimensions for the different alpha-olefine polymers were measured as reported in the accompanying Table I.

TABLE I

| Polymer | Identity Period along the chain axis, Å | x-ray melting point ° C. | x-ray density g/cc | Density by weight |
|---|---|---|---|---|
| Polypropylene | 6.50 ± 0.05 | 160 | 0.94 | 0.92 |
| Poly-alpha-butene | 6.70 ± 0.1 | 125 | 0.96 | 0.91 |

TABLE I-continued

| Polymer | Identity Period along the chain axis, Å | x-ray melting point ° C. | x-ray density g/cc | Density by weight |
|---|---|---|---|---|
| Poly-alpha-pentene | 6.60 ± 0.1 | 75 | — | 0.87 |
| Polystyrene | 6.65 ± 0.05 | 230 | 1.12 | 1.08 |

The-x-rays densities were calculated for polystyrene and polybutylene on the basis of an hexagonal cell (Space-group R 3c or R 3c) having respectively a = 21.9 Å for polystyrene and 17.3 Å for polybutene. The cell contains 6 chain portions containing each 3 monomeric units. As no sufficient data is available to establish the correct unit cell of polypropylene, the x-ray density for this polymer was calculated by indexing the equatorial X-ray reflections on the basis of an oblique cell with $\underline{a}$ = 6.56 Å, $\underline{b}$ = 5.46 Å, = 106° C. 30', and considering the identity period along the axis c = 6.5 Å

From the above it is clearly apparent that the identity period along the fiber axis is, in all cases, of the order of magnitude of 6.5–6.7 Å.

By comparing X-ray and density data, it may be seen that each stretch of principal chain included in the elementary cell corresponds to 3 monomeric units ($-CH_2-CHR-$), and, that therefore a regular succession of monomeric units having alternatively $\underline{d}$ and $\underline{l}$ asymmetric carbon atoms can be excluded. Among all possible remaining regular successions of $\underline{d}$ and $\underline{l}$ asymmetric carbon atoms which could lead to a crystalline polymer it is believed on the basis of the X-ray data, that the most probable is the one in which, at least for long portions of the main chain, all the asymmetric C atoms have the same steric configuration:

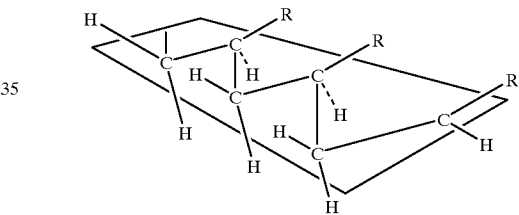

Model of a portion of the main chain of a crystalline poly-alpha-olefin according to the present invention, arbitrarily fully extended in a plane, in which the R substituents on the tertiary C atoms are all above and their H atoms below the plane of the chain.

In this case the stable existence of a planar fully extended paraffinic chain seems most unlikely, owing to the steric hindrance of the substituent groups R. In the crystalline state, the main chain must therefore assume a non-planar conformation. This conformation has been found to be spiral-like.

The hypothesis of a coiled conformation of the main chain in the crystalline state agrees with the value of the identity period along the same chain (6.5–6.7 Å) which is smaller than the length of the planar, fully extended structure (7.62 Å for 3 monomeric units).

Our linear, regular, head-to-tail macromolecules having substantially no branches longer than R and the main chain of which has substantially a structure of the kind illustrated in the model (isotactic structure) are recognized in the art (following us) as "isotactic" macromolecules, whereas our macromolecules having The term "isotactic" was originated by one of us, G. Natta, The partially isotactic polymers produced and isolated from the crude polymerizates by us, such as the partially crystalline fraction described in, for instance, Examples 1 and 2 below, comprise macromolecules consisting of sections having the Natta isotactic structure and sections having the Natta non-isotactic or atactic structure.

The isotactic structure imparts to the product properties not previously known for any hydrocarbon. In fact these products with a high molecular weight are, at room temperature, crystalline solids very different, e.g., from the elastomers obtained by known methods from isobutylene, which are crystallizable under stress and show a spiral-like linear chain, but with a different identity period. The substantial differences in the physical properties of the two types of polymers prepared by the present process (amorphous and crystalline) are summarized in Table 2.

amorphous ethersoluble polymers have a density lower than 0.90. Above the temperature at which the crystalline state disappears, the polypropylene products do not change directly into a flowing liquid, but retain the characteristics of an amorphous plastic substance. They can, therefore, be readily processed (at a temperature somewhat higher than the temperature of complete disappearance of the crystalline structure) by the methods (moulding, injection, extrusion) known for plastic materials. It is found, moreover, that these propylene polymers of Example I of very high molecular weight, with intrinsic viscosity above 3, having a high degree of crystallinity which is preserved up to relatively high temperatures (above 150° C.), show surprising mechanical characteristics, as will be further described, not

TABLE 2

| Polymer | 1st order transition temp. ° C. | 2nd order transition temp. ° C. | measured density | Solubility in boiling | | | | |
|---|---|---|---|---|---|---|---|---|
| | | | | Acetone | ethyl acetate | ethyl ether | n-heptane | toluene |
| Crystalline polypropylene | 155–165 | — | 0.92 | i | i | i | S.S. | S |
| Amorphous polypropylene | | (–70°) | 0.85 | S.S. | S.S. | S. | S. | V.S. |
| Crystalline polybutene | 120–130 | — | 0.91 | i | i | i | S. | V.S. |
| Amorphous polybutene | — | — | 0.87 | S.S. | S.S. | S. | V.S. | V.S. |
| Crystalline polypentene | 70–80 | — | 0.87 | i | i | S.S. | S. | V.S. |
| Amorphous polypentene | — | — | — | S.S. | S.S. | S. | V.S. | V.S. |
| Crystalline polystyrene | 210–230 | — | 1.08 | i | i | i | i | S. |
| Amorphous polystyrene | — | 80–90° | 1.05 | S.S. | S.S. | S. | S. | V.S. | i = insoluble
S = soluble
VS = very soluble
SS = slightly soluble

The very remarkable differences in the solubilities of the two types of polymer permit of their easy separation by extraction with suitable solvents. For a given polymeric alpha-olefin the crystalline products always show a much lower solubility than the amorphous products independently from the molecular weight, while the solubilities of polymers of the same type, but having different molecular weight, decrease slightly and gradually with an increase of the molecular weight.

When examining, e.g. the fractions obtained by fractional dissolution of the propylene polymers as described in Example I below, that portion of the product which may be extracted with ether (intrinsic viscosity 1) appears wholly amorphous under the X-rays. The further extracts in boiling n-heptane (intrinsic viscosity of extracted polypropylenes 1.2–1.3, average molecular weight probably within the range 45,000 to 55,000), appear already partially crystalline under the X-rays and melt completely at 150° C.

It was found that the polypropylene products which are insoluble in boiling n-heptane and having a higher molecular weight than those previously mentioned, probably above 100,000 (intrinsic viscosity above 3), are solids having a density between 0.90 and 0.94, and a high melting point (about 160° C). A density of about 0.94 is the upper limit for a completely crystalline product. Said density was calculated from reticular distances determined from X-rays diffraction patterns of fibers. The specific gravity is lowered by the presence of an amorphous portion and in fact the previously accertained for any known hydrocarbon so that they can be satisfactorily employed in making textile fibers.

The propylene polymers with very high molecular weight obtained by the instant method may be molded at temperatures higher than 130–150° C. to obtain plates, which are transparent when the product is well purified. Such plates may be cold stretched up to about 700%; the breaking load, referred to the section resulting after stretching, may be, e.g. for the product obtained according to Example II, higher than 30 kg/sq. mm., and even considerably higher if the product is drawn into thin filaments. The stretched filaments show a silk-like appearance and their good mechanical characteristics (high breaking load and high elongation at rupture of the stretched filament) make them particularly suitable for producing textile fibers.

The following examples are given to illustrate specific embodiments of the invention, it being understood that these examples are not limitative.

EXAMPLE I 1.8 g. of $TiCl_4$ dissolved in 50 ml. of anhydrous gasoline (b.p. 98° C.) are added dropwise, at a temperature slightly lower than room temperature (5–10° C.), to a solution of 11.4 g. triethyl aluminum in 150 ml. of gasoline. The solution is further diluted to 500 ml. and introduced into an oscillating stainless steel autoclave of about 2 liters capacity, previously thoroughly dried and evacuated. 190 g. of liquid, carefully dried propylene are then pumped in the autoclave and this is heated, while in motion, up to about 55–60° C. After the pressure has fallen from about 10 to about 2 atm. further 160 g. propylene are added. The pressure falls now at a lower rate, and after about 20 hours, no further pressure decrease being observed, the residual gases are vented. These latter consist chiefly of propylene (72.5 N liters) and contain a small amount of ethylene (0.2 N liters) probably originating from the decomposition of the catalyst. 95 g. of methanol are then pumped in the autoclave in order to decompose the catalyst; 5.7 liters of gas are evolved, more than 50% of which is propylene. The reaction product, formed of a solid mass drenced with gasoline and methanol is then extracted.

In order to remove the inorganic compounds originating from the decomposition of the catalyst, the polymer is suspended in di-isopropylether and the suspension is heated while strongly stirring and bubbling through gaseous HC1. After four hours a little methanol is added to the suspension in order to precipitate the polymer which might have been dissolved, and which is then filtered under suction. The polymer, after being dried at 100° C. under reduced pressure, weighs 180 g. and has an ash content of 0.22%. This product, containing a very wide range of propylene polymers, appears as a white, spongy solid, which at 140° C. has a transparent rubber-like appearance and at 155° C. is definitely melted. It can be moulded at 130° C. to flexible sheets which by X-ray diffraction patterns are shown to contain amorphous and crystalline portions. From the filtered liquid after distillation of the solvent a few grams of a very viscous oil are recovered.

The solid polymer mixture obtained is extracted in succession with boiling acetone, ethyl ether and n-heptane in an extractor of the Kumagawa type and for each solvent the extraction is continued until the percolating solvent does not contain any appreciable quantities of extracted polymer.

The acetone extract consists of oily, low molecular weight products and amounts to 2.8% of the solid polymer obtained. The ether extract, corresponding to 39% of the total polymer, after evaporation of the solvent in vacuum (intrinsic viscosity=1) is completely amorphous similar to an unvulcanized elastomer. The n-heptane extract, corresponding to 19% of the total polymer, after evaporation of the solvent in vacuum has an intrinsic viscosity of 1.2–1.3 and is, at room temperature, a partially crystalline solid, completely melted at 150°, which also shows the properties of an elastomer, however up to higher temperatures than the preceding fraction.

The residue insoluble in the three solvents of Example I has a specific gravity of about 0.92, and an intrinsic viscosity determined in tetrahydronaphthalene solution of 3.33 (100 ml/g). A 1% solution in tetralin shows a specific viscosity of 0.374. Synersis of this residue starts at 120° C. The polymer loses its crystallinity at about 150° C. and at 170° C. is wholly converted into a transparent, very viscous mass.

By moulding it in a flat press at 140–150° C., plates are obtained which appear crystalline under the X-rays, show a 700% elongation and a breaking load of 350 Kg/sq. cm., referred to the original section. The product extruded when warm (soft plastic mass) and then either warm or cold stretched appears very crystalline and has a very high breaking load. A cold stretched thread of 0.3 mm. diameter after stretching shows e.g., a breaking load of 32 Kg/sq. mm. and an elongation of 40%.

Characteristics similar to those described above, with a lower tensile strength, are exhibited by the residue of the extraction with ether, which has properties intermediate those of n-heptane extract and those of the n-heptane residue.

By carrying out the polymerization of propylene in the presence of a polymerization agent prepared by reacting in the cold and in the absence of any olefin, tripropyl aluminum with titanium tetrachloride, the polymerization product has a much higher average molecular weight, as described in the following example.

EXAMPLE II

To a solution of 7.8 g. tripropyl aluminum in 70 cc. heptane are added dropwise at 0° C. and under nitrogen 1.9 g. titanium tetrachloride dissolved in 25 cc. heptane. The suspension is diluted to 200 cc. with heptane and introduced under nitrogen in a 435 cc. autoclave. After adding 102 g. propylene, the autoclave is heated under stirring to 60° C., and is kept for about 40 hours at temperature between 60 and 68° C. The unreacted gases are then vented and 50 cc. of methanol are pumped into the autoclave to coagulate the polymer. The obtained product is purified as described in Example I, and 17.2 g. solid polymer are obtained, which are fractionated by hot solvent extraction.

The acetone extract corresponds to 27.6% of the total and comprises semi-solid products of low molecular weight.

The ether extract corresponds to 26.9% of the total and comprises a solid product of gummy appearance having an intrinsic viscosity of 1.57 (molecular weight about 63,000). This fraction is amorphous at the X-rays. The heptane extract corresponds to 15.1% of the obtained polymer and consists of partially crystalline polypropylene having an intrinsic viscosity of 2.36 (molecular weight about 120,000).

The extraction residue comprises highly crystalline polypropylene having an intrinsic viscosity of 5.1 (molecular weight approximately 390,000).

The obtained product may be easily oriented by hot drawing. Thus without prior removal of the amorphous portions having a lower molecular weight, the polymer mixture may be extruded to form filaments which, after cold stretching, show good mechanical properties.

EXAMPLE III

The polymerization was carried out as in the foregoing Example I, however in the cold (temperature 20° C.), by introducing in the autoclave 167 g. propylene, obtaining pressures of 3.0–3.6 atm. The polymerization is much slower and less complete. In fact, only 32 g. of polymer were obtained, of which 21 g. consisted of solid polymer.

The solid polymer obtained is extractable for 7% with acetone in the heat, for 40.5% with ether and for 28% with heptane. After said extractions, 24% of the polymer obtained remains as residue. The fractions thus obtained have properties similar to those described in the preceding example.

EXAMPLE IV

After preparing the initiator as described in Example I and introducing the same in the autoclave, the latter is charged with one single batch of 270 grams of propylene. The temperature is maintained between 60 and 70° C. and the autoclave is kept in motion until pressure has decreased from an initial 15 to about 11 atmospheres. The gases vented from the autoclave after polymerization has terminated, contain 97.4 liters of propylene and 0.4 liter of ethylene. 3.5 liters of propylene and 0.5 liter of ethylene are evolved by the decomposition of the catalyst which is carried out as in Example I. 83 g. of polymer were obtained, which was purified as in Example I.

The acetone extract of the polymer obtained amounts to 7.1% and consists of oily products.

The ether extract corresponds to 43.9% and consists of an amorphous solid substance having in tetralin solution an intrinsic viscosity equal to 10. The heptane extract corresponds to 17.8% and consists of a partially crystalline solid having an intrinsic viscosity of 1.31. The residue which remains after said extractions corresponds to 31.2% and consists of a highly crystalline solid having a first order transition point of about 160° C. and an intrinsic viscosity in tetralin at 135° C. equal to 3.

EXAMPLE V

One gram of isopropyl alcohol is added to a solution of 5.7 grams $Al(C_2H_5)_3$ dissolved in 70 ml. gasoline. The resulting mixture is cooled to 0.5° C. and a solution of 1.8 grams $TiCl_4$ in 25 ml. gasoline is added dropwise thereto. The solution is then diluted by adding 100 ml. gasoline and the resulting polymerization initiator is then transferred to a 430 ml. autoclave. 95 grams of propylene are then introduced and the autoclave is kept in motion, while heating the same to 65 to 70° C. until the pressure has decreased from an initial 24 to 17 atmospheres. A second batch of 21 grams propylene is then introduced, with pressure rising to 28 atmospheres and again decreasing gradually to 15 atmospheres, whereupon polymerization is terminated. The unreacted gases which are then drawn from the autoclave contain 9 liters (standard conditions) of propylene. The catalyst is then decomposed by introducing methanol in the autoclave and the reaction product forming a solid mass soaked with gasoline and methanol is discharged.

The polymer is purified by treatment with ether and hydrochloric acid in the heat and then coagulated completely with a large quantity of methanol. After filtration and hot drying under vacuum, the polymer amounts to 96 g. and consists of a white solid product which is fractionated by hot extraction with solvents.

The acetone extract corresponds to 9.30% of the polymer obtained and consists of oily, low molecular weight products.

The ether extract corresponds to 43.3% of the polymer obtained and consists of a rubbery, amorphous solid having in tetralin solutions at 135° C. an intrinsic viscosity of 0.8 (corresponding to a molecular weight of about 23,000).

The heptane extract corresponds to 18.7% of the polymer obtained and consists of a partially crystalline solid having an intrinsic viscosity equal to 1 (corresponding to a molecular weight of about 32,000). The residue which remains after said extractions corresponds to 30.6% of the total polymer and consists of a powdery, highly crystalline solid having an intrinsic viscosity of 2.7 (corresponding to a molecular weight of about 150,000).

EXAMPLE VI

Small amounts of ethylene contained in the propylene do not interfere with the polymerization. It is observed, however, that ethylene polymerizes more rapidly than propylene. By employing in the three foregoing examples a propylene which contains 5% ethylene, it is observed that the polymerization residual gases are impoverished in ethylene. The characteristics of the final products are, however, only slightly altered. Under the X-rays, they still show the typical polypropylene structure, even if accompanied by an amount of amorphous substances larger than in the polymers obtained from ethylene-free propylene.

As noted, if the vinylhydrocarbon contains a small amount of ethylene, a copolymer results. Such copolymers have properties similar to those of the homopolymer. Thus, when 5% of ethylene is mixed with the propylene or other vinylhydrocarbon, it is observed that the residual gases obtained after the polymerization has terminated are impoverished in the ethylene, indicating acceptance of ethylene into the polymer molecule. However, the properties of the polymeric products thus obtained are only slightly altered as compared to those of polypropylene or other polyvinylhydrocarbon, In the formula $CH_2=CHR$, R may contain from 1 to 16 carbon atoms, and in specifically preferred embodiments may be an alkyl, cycloalkyl or aryl radical.

It will be understood that while there have been described herein certain embodiments of our invention, it is not intended thereby to have the invention limited to the specific details given in view of the fact that it is susceptible to various modifications and changes which come within the spirit of the specification and the scope of the appended claims.

What is claimed is:

1. A process which comprises polymerizing ethylene with an alpha-olefin, $CH_2=CHR$, wherein R is a saturated aliphatic radical with 2 or more carbon atoms or a cycloaliphatic radical, in the presence of a catalyst obtained by reacting an aluminum alkyl compound with a catalytic titanium halide compound.

2. A process according to claim 1, wherein the catalytic titanium halide compound is a chloride of titanium.

3. A process according to claim 1, wherein the alkyl aluminum compound has at least two valances of aluminum satisfied by an alkyl group, while the third valence is satisfied by an alkyl group or a halide group.

4. A process according to claim 2, wherein the alkyl aluminum compound has at least two valances of aluminum satisfied by an alkyl group, while the third valence is satisfied by an alkyl group or a halide group.

5. A process as in claim 3 in which the alpha olefin is butene-1.

6. A process as in claim 3 in which the alpha olefin is pentene-1.

7. A process as in claim 3 in which the alpha olefin is hexene-1.

8. A process comprising polymerizing ethylene with an alpha olefin, $CH_2=CHR$, wherein R is a saturated aliphatic radical with two or more carbon atoms or a cycloaliphatic radical, in the presence of a catalyst made from a reaction between (a) a chloride of titanium with (b) an aluminum alkyl compound.

9. A process for preparing a copolymer comprising copolymerizing monomeric olefin molecules comprising a monomeric vinyl hydrocarbon having the formula $CH_2=CHR$, wherein R is a saturated aliphatic radical having at least 2 carbon atoms or is a cycloaliphatic radical, in the presence of a catalyst comprising a catalytic aluminum alkyl compound and a catalytic titanium halide compound.

10. A process according to claim 9 wherein the catalytic titanium halide compound is a titanium chloride compound.

11. A process according to claim 10 wherein the titanium chloride compound is titanium tetrachloride.

12. A process according to claim 9 wherein the alkyl of the catalytic aluminum alkyl compound is selected from the group consisting of ethyl, propyl, butyl, and combinations of these alkyl groups.

13. A process according to claim 12 wherein the catalytic aluminum alkyl compound is triethyl aluminum.

14. A process according to claim 12 wherein the catalytic aluminum alkyl compound is tripropyl aluminum.

15. A process according to claim 9 wherein the catalytic titanium halide compound is titanium tetrachloride.

16. A process according to claim 9 wherein the monomeric olefin molecules comprise ethylene, the monomeric vinyl hydrocarbon is selected from the group consisting of 1-butene, 1-pentene, and 1-hexene, the alkyl of the catalytic aluminum alkyl compound is selected from the group consisting of ethyl, propyl, butyl, and combinations of these alkyl groups, and the catalytic titanium halide compound is a titanium chloride compound.

17. A process according to claim 16 wherein the titanium chloride compound is titanium tetrachloride.

18. A process according to claim 17 wherein the monomeric vinyl hydrocarbon is 1-butene.

19. A process according to claim 17 wherein the monomeric vinyl hydrocarbon is 1-pentene.

20. A process according to claim 17 wherein the monomeric vinyl hydrocarbon is 1-hexene.

21. A process according to claim 9 wherein the monomeric olefin molecules comprise ethylene.

22. A process for preparing a copolymer comprising copolymerizing olefins comprising a monomeric vinyl hydrocarbon having the formula $CH_2$=CHR wherein R is a saturated aliphatic radical having at least 2 carbon atoms or is a cycloaliphatic radical, in the presence of a catalyst comprising a catalytic aluminum alkyl compound and a catalytic titanium halide compound.

23. A process according to claim 22 wherein the catalytic titanium halide compound is a titanium chloride compound.

24. A process according to claim 23 wherein the titanium chloride compound is titanium tetrachloride.

25. A process according to claim 22 wherein the alkyl of the catalytic aluminum alkyl compound is selected from the group consisting of ethyl, propyl, butyl, and combinations of these alkyl groups.

26. A process according to claim 25 wherein the catalytic aluminum alkyl compound is triethyl aluminum.

27. A process according to claim 25 wherein the catalytic aluminum alkyl compound is tripropyl aluminum.

28. A process according to claim 22 wherein the catalytic titanium halide compound is titanium tetrachloride.

29. A process according to claim 22 wherein the olefins comprise an olefin without a vinyl group which is ethylene, the monomeric vinyl hydrocarbon is selected from the group consisting of 1-butene, 1-pentene, and 1-hexene, the alkyl of the catalytic aluminum alkyl compound is selected from the group consisting of ethyl, propyl, butyl, and combinations of these alkyl groups, and the catalytic titanium halide compound is a titanium chloride compound.

30. A process according to claim 29 wherein the titanium chloride compound is titanium tetrachloride.

31. A process for preparing a copolymer comprising copolymerizing (i) an olefin having the formula $CH_2$=CHR wherein R is a saturated aliphatic radical having at least two carbon atoms or is a cycloaliphatic radical with (ii) an olefin without a vinyl group which is ethylene, in the presence of a catalyst comprising a catalytic aluminum alkyl compound and a catalytic titanium halide compound.

32. A process according to claim 31 wherein in the olefin having the formula $CH_2$=CHR, R is a saturated aliphatic radical having at least two carbon atoms.

33. A process according to claim 32 wherein the olefin having the formula $CH_2$=CHR is selected from the group consisting of 1-butene, 1-pentene, and 1-hexene, the alkyl of the catalytic aluminum alkyl compound is selected from the group consisting of ethyl, propyl, butyl, and combinations of these alkyl groups, and the catalytic titanium halide compound is a titanium chloride compound.

34. A process according to claim 33 wherein the titanium chloride compound is titanium tetrachloride.

* * * * *

UNITED STATES PATENT AND TRADEMARK OFFICE
CERTIFICATE OF CORRECTION

PATENT NO. : 6,365,687 B1  
DATED : April 2, 2002  
INVENTOR(S) : Giulio Natta et al.

It is certified that error appears in the above-identified patent and that said Letters Patent is hereby corrected as shown below:

<u>Title page,</u>  
Item [73], please change the Assignee name "Basell Poliolefine S.p.A., Milan (IT)" to read -- Basell Poliolefine Italia S.p.A., Milan (IT) --

Signed and Sealed this

Twenty-third Day of July, 2002

Attest:

Attesting Officer

JAMES E. ROGAN  
*Director of the United States Patent and Trademark Office*

(12) EX PARTE REEXAMINATION CERTIFICATE (7150th)
United States Patent
Natta et al.

(10) Number: US 6,365,687 C1
(45) Certificate Issued: Nov. 10, 2009

(54) PROCESS FOR THE POLYMERIZATION AND COPOLYMERIZATION OF CERTAIN UNSATURATED HYDROCARBONS

(75) Inventors: Giulio Natta, Milan (IT); Piero Pino, Milan (IT); Giorgio Mazzanti, Milan (IT)

(73) Assignee: Basell Poliolefine Italia S.p.A., Milan (IT)

Reexamination Request:
No. 90/006,297, Jun. 7, 2002

Reexamination Certificate for:
Patent No.: 6,365,687
Issued: Apr. 2, 2002
Appl. No.: 07/883,912
Filed: May 12, 1992

Related U.S. Application Data

(60) Continuation of application No. 07/719,666, filed on Jun. 24, 1991, now abandoned, which is a continuation of application No. 07/607,215, filed on Oct. 29, 1990, now abandoned, which is a continuation of application No. 06/906,600, filed on Sep. 10, 1986, now abandoned, which is a continuation of application No. 06/498,699, filed on May 27, 1983, now abandoned, which is a continuation of application No. 04/710,840, filed on Jan. 24, 1958, now abandoned, which is a division of application No. 04/514,097, filed on Jun. 5, 1955, now abandoned.

(30) Foreign Application Priority Data

Jun. 19, 1954 (IT) .................................................. 24227
Jul. 19, 1954 (IT) .................................................. 25109

(51) Int. Cl.
*B29C 59/00* (2006.01)
*C08F 10/00* (2006.01)
*C08L 23/00* (2006.01)
*C08L 53/00* (2006.01)
*C08L 23/12* (2006.01)
*C08L 23/20* (2006.01)

(52) U.S. Cl. ................. 526/159; 526/308; 526/348; 526/348.5; 526/348.6

(58) Field of Classification Search .................. None
See application file for complete search history.

(56) References Cited

U.S. PATENT DOCUMENTS

| | | | | |
|---|---|---|---|---|
| 2,692,257 A | * | 10/1954 | Zletz | 526/104 |
| 2,699,457 A | * | 1/1955 | Ziegler et al. | 585/518 |
| 2,731,453 A | * | 1/1956 | Field et al. | 526/105 |
| 3,058,963 A | * | 10/1962 | Vandenberg | 526/153 |
| 3,250,755 A | * | 5/1966 | Natta et al. | 260/88.2 |
| 3,256,235 A | * | 6/1966 | Natta et al. | 260/41 |
| 3,317,496 A | * | 5/1967 | Natta et al. | 260/88.2 |
| 3,403,139 A | * | 9/1968 | Natta et al. | 260/88.2 |
| 3,582,987 A | * | 6/1971 | Natta et al. | 260/93.5 |
| 3,715,344 A | * | 2/1973 | Natta et al. | 260/93.7 |
| 4,125,698 A | * | 11/1978 | Ziegler et al. | 526/159 |

* cited by examiner

*Primary Examiner*—Stephen J Stein

(57) ABSTRACT

This invention relates to a process for copolymerizing unsaturated hydrocarbons of the formula $CH_2=CHR$ in which R is a saturated aliphatic radical with two or more carbon atoms or a cycloaliphatic radical, in the presence of a catalyst comprising a catalytic aluminum alkyl compound and a catalytic titanium halide compound.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–34 are cancelled.

* * * * *